United States Patent
Chang et al.

(10) Patent No.: US 6,870,437 B2
(45) Date of Patent: Mar. 22, 2005

(54) ELECTRO-MAGNETIC INTERFERENCE PROTECTION CIRCUIT AND METHOD FOR A CLOCK BUFFER

(75) Inventors: Chia-Cheng Chang, Taipei Hsien (TW); Muh-Jin Uang, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 21 days.

(21) Appl. No.: 10/605,033

(22) Filed: Sep. 3, 2003

(65) Prior Publication Data

US 2004/0246061 A1 Dec. 9, 2004

(30) Foreign Application Priority Data

Jun. 6, 2003 (TW) .......................................... 92115368 A

(51) Int. Cl.[7] .................................................. H03H 7/00
(52) U.S. Cl. .......................................... 333/12; 333/181
(58) Field of Search ........................... 333/12, 182, 184, 333/185

(56) References Cited

U.S. PATENT DOCUMENTS

| 5,068,631 | A  | * | 11/1991 | Vince ......................... 333/181 |
| 6,112,118 | A  | * | 8/2000  | Kroll et al. ..................... 607/5 |
| 6,714,092 | B1 | * | 3/2004  | Ramesh ....................... 333/12 |
| 6,781,431 | B2 | * | 8/2004  | Taito et al. .................. 327/291 |

* cited by examiner

Primary Examiner—Robert Pascal
Assistant Examiner—Dean Takaoka
(74) Attorney, Agent, or Firm—Jiang Chyun IP Office

(57) ABSTRACT

The present invention provides an electro-magnetic interference protection circuit for a clock buffer. The present invention not only uses a ferrite bead that is serially connected with the power source of the clock buffer to protect the clock buffer from electro-magnetic interference. The ferrite bead also connects in parallel with a capacitor to reduce the distortion of a clock signal out-putting by the clock buffer due to the ferrite bead, thereby making the communication devices work properly.

10 Claims, 2 Drawing Sheets

ELECTRO-MAGNETIC INTERFERENCE PROTECTION CIRCUIT AND METHOD FOR A CLOCK BUFFER

CROSS REFERENCE TO RELATED APPLICATIONS

This application claims the priority benefit of Taiwan application serial no. 92115368, filed on Jun. 6, 2003.

BACKGROUND OF INVENTION

1. Field of the Invention

This invention generally relates to an electro-magnetic interference protection circuit and a method, and more particularly toan electro-magnetic interference protection circuit and a method for a clock buffer.

2. Description of Related Art

As the technology advances, Internet becomes one of the most important resources for people to obtain knowledge and is a powerful tool for commercial transactions. Modem has been used in personal computers for Internet connection. Today, high speed Internet solutions such as ADSL products are widely used for better quality. In those communication devices, the transceiver ICs are driven by clock signals that are distributed from clock buffers. Hence, how to protect the clock buffers from electro-magnetic interference ("EMI") is an important issue.

Conventionally, a ferrite bead is serially connected to the power source of the clock buffer for EMI protection. However, because of its inductor characteristic, the ferrite bead also affects the waveform of the clock signal. FIG. 1 is a timing diagram of the input clock signal clk-in and the output clock signal clk-out when the ferrite bead is serially connected to the power source of the clock buffer. As shown in FIG.1, the waveform of the output clock signal clk-out is affected by the ferrite bead. Hence, the communication devices cannot work properly because the highest voltage level and the lowest voltage level of the output clock signal clk-out are too close to be determined. Although the ferrite bead may protect the clock buffer from EMI, it affects the output clock signal of the clock buffer. Therefore, a solution for EMI protection without affecting the output clock signal of the clock buffer is needed.

SUMMARY OF INVENTION

An object of the present invention is to provide an electro-magnetic interference protection circuit and method for a clock buffer to protect the clock buffer from EMI and to keep the communication device work properly.

In accordance with the above objects and other advantages of the present invention, an electro-magnetic interference protection circuit for a clock buffer is provided. The electro-magnetic interference protection circuit comprises a clock buffer for receiving a clock signal and buffer-outputting the clock signal; a ferrite bead, the ferrite bead serially being connected to the power source of the clock buffer to protect the clock buffer from electro-magnetic interference (e.g., the power source); and a capacitor connected in parallel with the ferrite bead to reduce the distortion of the clock signal due to the ferrite bead.

In an embodiment of the present invention, the ferrite bead's impedance is at a maximum at the frequency of the electro-magnetic interference. For example, when the frequency of the electro-magnetic interference is 125 MHz, the ferrite bead's impedance is at a maximum at 125 MHz to protect the clock buffer from EMI.

In an embodiment of the present invention, the impedance of the capacitor is at a minimum at the frequency of the clock signal. For example, when the frequency of the clock signal is 25 MHz, the impedance of the capacitor is at a minimum at 25 MHz to reduce the distortion of a clock signal outputting by the clock buffer due to the ferrite bead.

The present invention provides an electro-magnetic interference protection method for a clock buffer. The method comprises the steps of: connecting a ferrite bead in serial with the power source of the clock buffer to protect the clock buffer from electro-magnetic interference (e.g., the power source); and connecting a capacitor in parallel with the ferrite bead to reduce the distortion of a clock signal outputting by the clock buffer due to the ferrite bead.

In an embodiment of the present invention, the ferrite bead's impedance is at a maximum at the frequency of the electro-magnetic interference. For example, when the frequency of the electro-magnetic interference is 125 MHz, the ferrite bead's impedance is at a maximum at 125 MHz to protect the clock buffer from EMI.

In an embodiment of the present invention, the impedance of the capacitor is at a minimum at the frequency of the clock signal. For example, when the frequency of the clock signal is 25 MHz, the impedance of the capacitor is at a minimum at 25 MHz to reduce the distortion of a clock signal outputting by the clock buffer due to the ferrite bead.

Accordingly, the present invention not only uses a ferrite bead to protect the clock buffer from electro-magnetic interference, but also connects a capacitor in parallel with the ferrite bead to reduce the distortion of a clock signal output by the clock buffer due to the ferrite bead, thereby making the communication devices work properly.

The above is a brief description of some deficiencies in the prior art and advantages of the present invention. Other features, advantages and embodiments of the invention will be apparent to those skilled in the art from the following description, accompanying drawings and appended claims.

DETAILED DESCRIPTION

Figure 1:
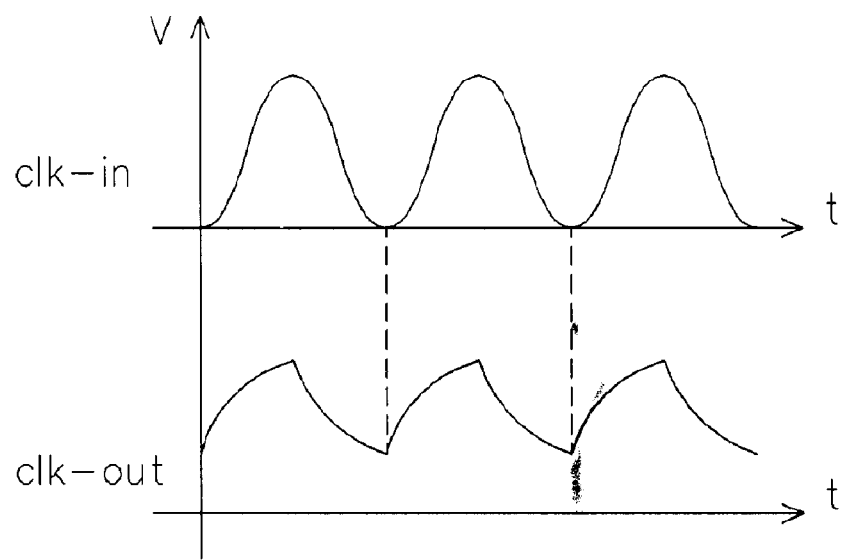
FIG. 1 is a timing diagram of the input clock signal clk-in and the output clock signal clk-out when the ferrite bead is connected in serial with the power source of the clock buffer.
Figure 2:
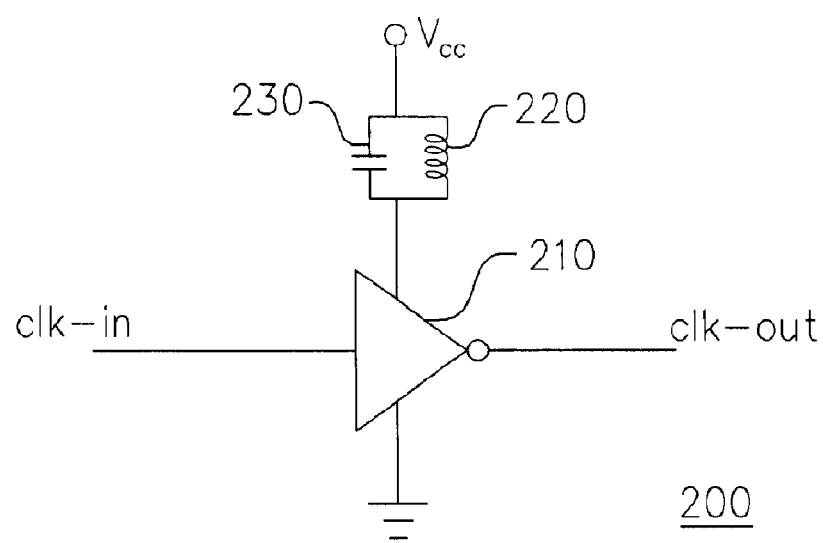
FIG. 2 is an embodiment of an electro-magnetic interference protection method for a clock buffer in accordance with the present invention.

FIG. 2 is an embodiment of an electro-magnetic interference protection circuit for a clock buffer in accordance with the present invention. The electro-magnetic interference protection circuit 200 includes a clock buffer 210, a ferrite bead 220, and a capacitor 230.

The clock buffer 210 receives the clock signal clk-in and buffer-outputs the clock signal clk-out to drive the transceiver IC (not shown in the figures) in the communication device. Generally, the power source is the main source of the EMI. For example, in this embodiment, an EMI source has been found by experiment in the power source of the clock buffer 210.

A ferrite bead 220 is connected to the power source terminal Vcc to protect the clock buffer from EMI at 125 MHz.

Figure 3:
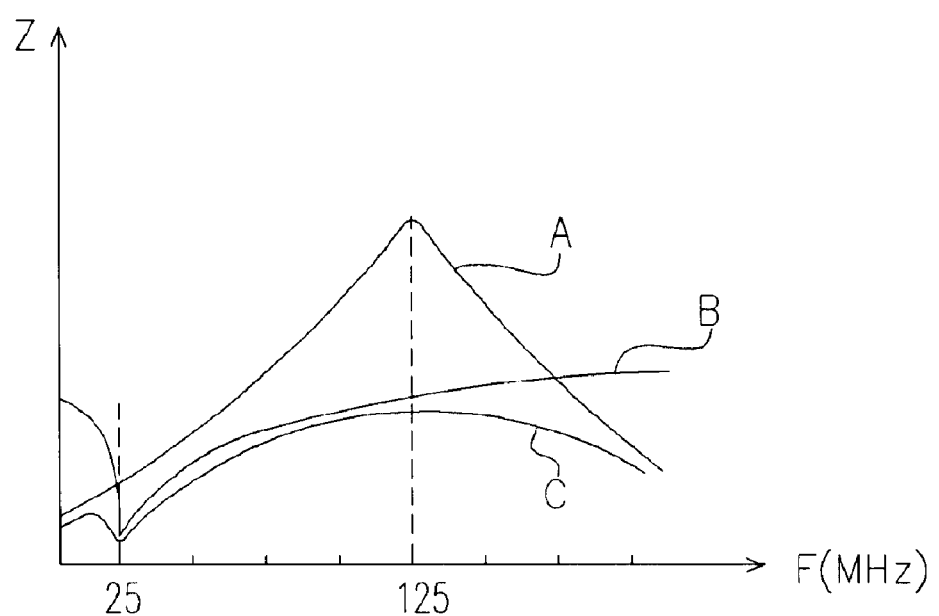
FIG. 3 is the impedance characteristic curves in accordance with an embodiment of the present invention.

To achieve the best result, the ferrite bead 20 having a maximum impedance at 125 MHz will be used. Referring to FIG.3, the curve A is the impedance characteristic curve for the ferrite bead 220 in this embodiment (Model No. MLB-201209-450B-N3). Because curve A has a maximum impedance at 125 MHz, the ferrite bead 220 corresponding to curve A can achieve the best result to protect the clock buffer 210 from EMI at 125 MHz.

Furthermore, to prevent the clock signal clk-out from distortion by the ferrite bead 220, the capacitor 230 is connected in parallel with the ferrite bead 220. To achieve the best result, the capacitor 230 having a minimum impedance at the frequency of the clock signal clk-out will be used. In this embodiment, the frequency of clk-out is 25 MHz. Hence, a 4.7 $\mu$F capacitor is used because its impedance is at a minimum at 25 MHz as showing in curve B of FIG.3. The resultant impedance characteristic curve of the ferrite bead 220 and the capacitor 230 is shown in curve C of FIG.3.

Accordingly, the present invention at least has the following advantages.

First, the clock buffer is protected from EMI.

Secondly, the communication device using the clock buffer can work properly.

Thirdly, the cost for protection from EMI is less because the present invention prevents the main EMI source (the power source) from interfering the clock buffer.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. An electro-magnetic interference protection circuit for a clock buffer, comprising:
    a clock buffer, for receiving a clock signal and buffer-outputting said clock signal;
    a ferrite bead, wherein said ferrite bead is connected in serial with a power source of said clock buffer to protect said clock buffer from electro-magnetic interference; and
    a capacitor, wherein said capacitor is connected in parallel with said ferrite bead to reduce the distortion of said clock signal due to said ferrite bead.

2. The electro-magnetic interference protection circuit for a clock buffer of claim 1, wherein an impedance of said ferrite bead is at a maximum at a frequency of said electro-magnetic interference.

3. The electro-magnetic interference protection circuit for a clock buffer of claim 1, wherein a frequency of said electro-magnetic interference is 125 MHz.

4. The electro-magnetic interference protection circuit for a clock buffer of claim 1, wherein an impedance of said capacitor is at a minimum at a frequency of said clock signal.

5. The electro-magnetic interference protection circuit for a clock buffer of claim 1, wherein a frequency of said clock signal is 25 MHz.

6. An electro-magnetic interference protection method for a clock buffer, comprising the steps of:
    connecting a ferrite bead in serial with a power source of said clock buffer to protect said clock buffer from electro-magnetic interference; and
    connecting a capacitor in parallel with said ferrite bead to reduce the distortion of a clock signal out-putting by said clock buffer due to said ferrite bead.

7. The electro-magnetic interference protection method for a clock buffer of claim 6, wherein an impedance of said ferrite bead is at a maximum at a frequency of said electro-magnetic interference.

8. The electro-magnetic interference protection method for a clock buffer of claim 6, wherein a frequency of said electromagnetic interference is 125 MHz.

9. The electro-magnetic interference protection method for a clock buffer of claim 6, wherein an impedance of said capacitor is at a minimum at a frequency of said clock signal.

10. The electro-magnetic interference protection circuit for a clock buffer of claim 6, wherein a frequency of said clock signal is 25 MHz.

* * * * *